B. J. BORGMANN.
SHOCK ABSORBER.
APPLICATION FILED FEB. 15, 1917.
1,242,134.
Patented Oct. 9, 1917.
2 SHEETS—SHEET 2.
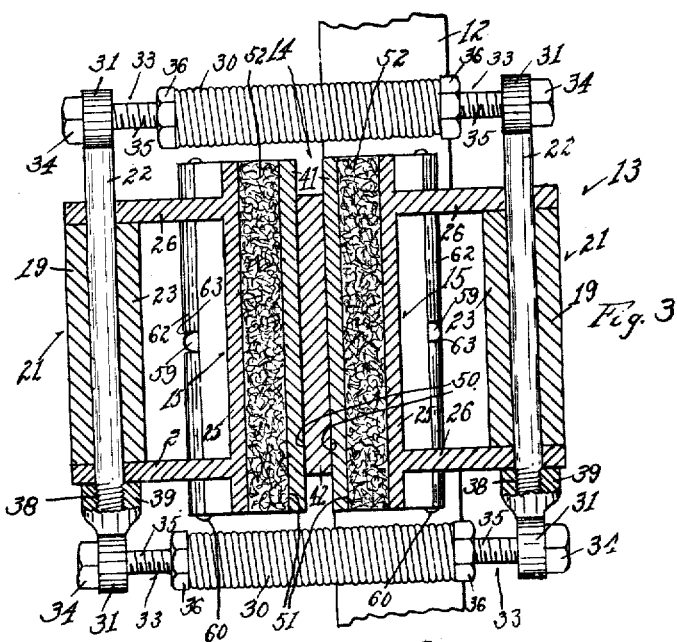
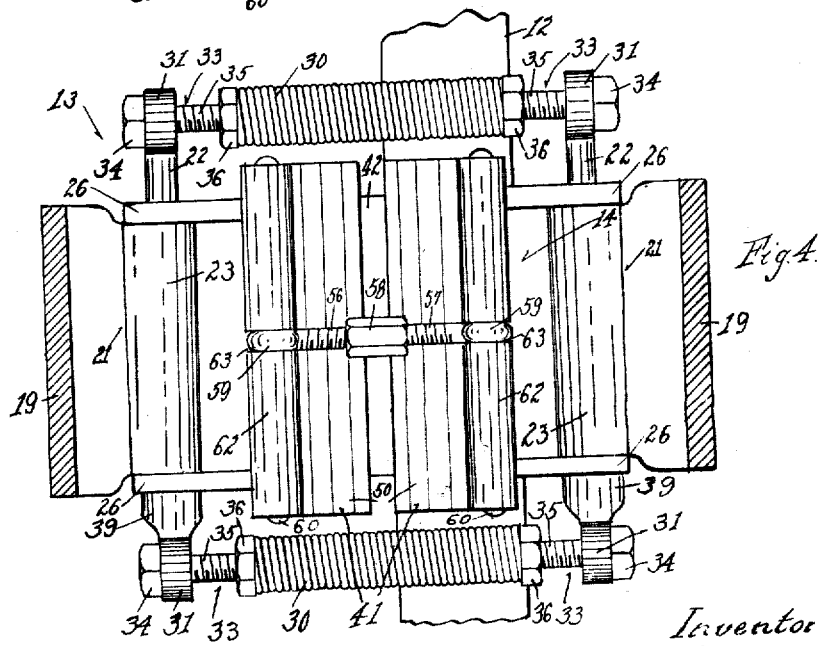

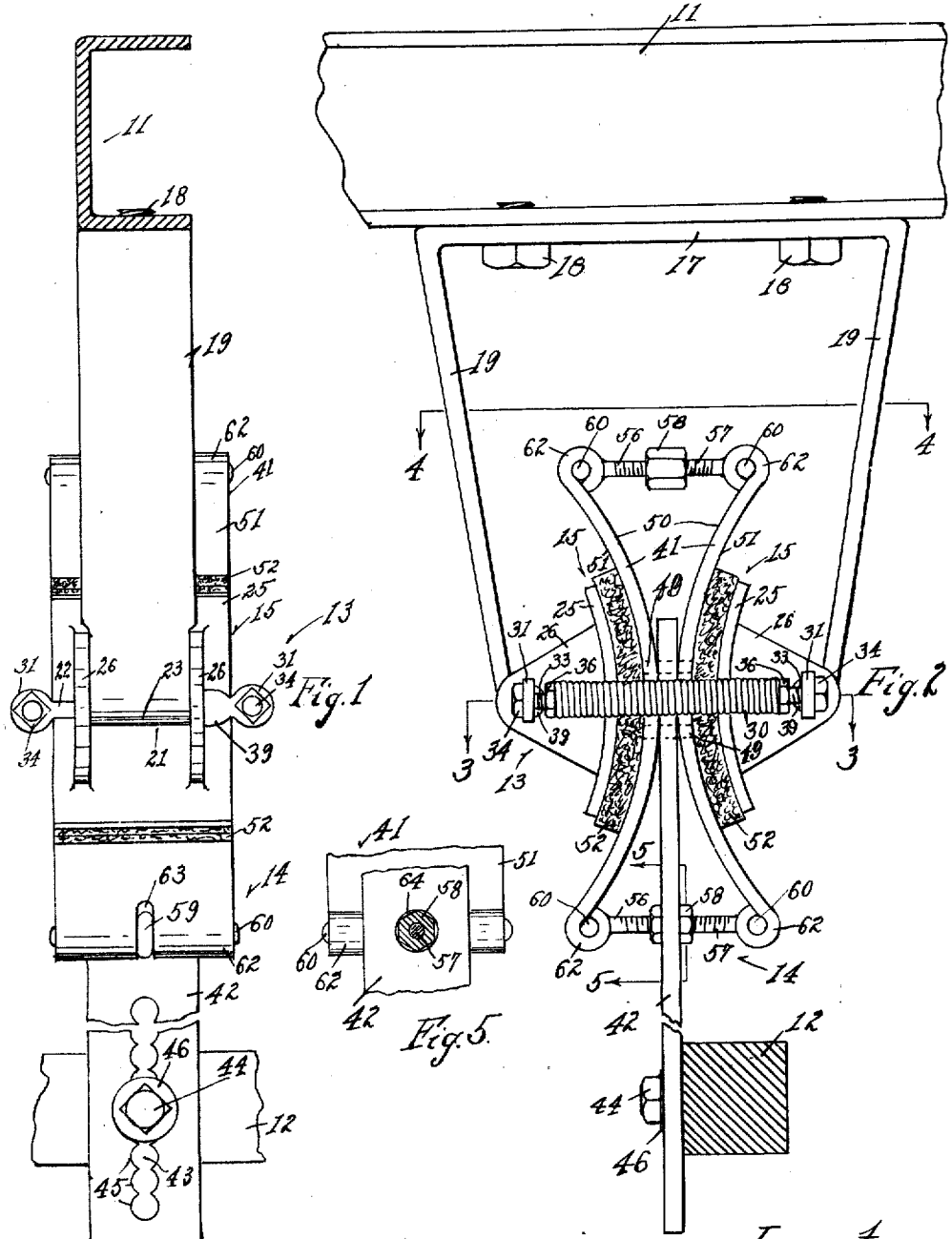

UNITED STATES PATENT OFFICE.

BERNARD J. BORGMANN, OF CINCINNATI, OHIO.

SHOCK-ABSORBER.

1,242,134.

Specification of Letters Patent.  Patented Oct. 9, 1917.

Application filed February 15, 1917. Serial No. 148,745.

*To all whom it may concern:*

Be it known that I, BERNARD J. BORGMANN, a citizen of the United States, residing at Cincinnati, in the county of Hamilton and State of Ohio, have invented certain new and useful Improvements in Shock-Absorbers, of which the following is a specification.

My invention relates to shock absorbers which may be used in connection with the springs of automobiles or other vehicles, to reduce the strain upon such springs during the compression and rebound thereof, or which may be used wherever it is desired to reduce or eliminate shock or sudden strain between two bodies, movable relative one to the other.

It is an object of my invention to provide a shock absorber for this purpose, comprising novel means for gradually increasing the frictional resistance exerted by one body to the movement of the other, as the movement of the latter is continued; and further, to provide novel means for adjusting the frictional resistance exerted between the movable bodies.

Other objects of my invention will appear from the following description and claims, and from the drawings, in which latter:

Figure 1 is an end elevation of my improved shock absorber.

Fig. 2 is a side elevation of the same.

Fig. 3 is an enlarged transverse section on the line 3—3 of Fig. 2.

Fig. 4 is a similar section on the line 4—4 of Fig. 2; and,

Fig. 5 is a detail vertical section on the line 5—5 of Fig. 2.

11, 12, represent the bodies, movable relative to each other, to which my shock absorber is applied, the body 11 being instanced, for the purpose of illustration, as a portion of the chassis of an automobile, and the body 12 as the axle of the same. Any standard, or preferred type of springs, not shown, are adapted to be positioned between the axle and the chassis in the usual manner.

13 represents one member of the shock absorber, and 14 the other member thereof, which is movable relative to the first member, the member 13 being exemplified as secured to the chassis, and the member 14 as secured to the axle by an adjustable connection.

The member 13 is exemplified as provided with contact-shoes 15 between which and the member 14 movement is adapted to take place to form a frictional resistance between the said members, the member 13 being instanced as comprising a supporting spring-bow, the base 17 of which is secured to the chassis, as by bolts 18. The arms 19 of the bow, depending from base 17, are each exemplified as terminating in a bearing support 21 for a pin 22 the bearing support being instanced as formed by reversely curling the ends of the respective arms as shown at 23.

Contact-shoes 15 are adapted to be pivotally supported upon the respective pins 22. The shoes are exemplified as each comprising an arcuate plate 25, having spaced bearing ears 26 upon the curved face thereof comprising the inner arcuate curve through which the respective pins 22 are adapted to be received, the plates being arranged with their faces, which comprise the outer arcuate curve, in opposed spaced relation, and with the chords of the arcs forming the plates, perpendicular to pins 22 and normally substantially parallel.

The resiliency of arms 19 of the supporting bow-spring will tend to force shoes 15 toward each other, but additional means are preferably provided for urging the shoes toward one another, instanced as comprising springs, preferably helical spring 30, connecting the ends of the respective pins 22 at each side of the bow-spring. Springs 30 are adapted to be adjustably connected to pins 22, to vary the tension of the springs as desired, the ends of pins 22 being exemplified for this purpose, as each provided with an axially projecting bearing-ear 31, adapted to each support a bolt 33 with the head 34 of the bolt abutting against the bearing-ear, and the shank 35 of the bolt having a nut 36 threaded thereon. Nuts 36 are secured to the respective ends of each spring 30, as by anchoring the end of the spring in a suitable aperture in the nut, the bolts threaded through the respective nuts being adapted to adjust the ends of each spring relative to pins 22, by turning the bolts in their bearing-ears 31. The bearing-ear at one end of each pin 22 is preferably removably secured to the pin, to permit of assembling of the parts of the device, the removable connection being exemplified as a threaded connection 38 between the end of the pin and the bore of a collar 39 preferably integral with the bearing-ear.

Member 14 of the shock absorber is exemplified as comprising arcuate friction-plates 41, oppositely disposed upon a suitable support. The friction-plates are arranged to be received between shoes 15 and contact therewith to form a frictional resistance to the movement of member 14 relative to member 13. The support for friction-plates 41 is exemplified as comprising a stem 42, having an adjustable connection with axle 12 of the vehicle, this connection being instanced as comprising a slot 43 extending longitudinally of the stem and adapted to receive a bolt 44 which is threaded into a suitable opening in the axle. Slot 43 is preferably provided with a series of serrations 45 at the sides thereof, arranged to engage bolt 44, and the bolt is preferably provided with a usual washer 46 between its head and the walls of slot 43.

Arcuate friction-plates 41 are preferably secured to each side of stem 42 at a point intermediate of the ends of the plates, as by rivets 49, the plates being arranged with their curved faces 50, comprising the outer arcuate curve, against stem 42, and their curved faces 51, comprising the inner arcuate curve, preferably spaced from the respective arcuate plates 25 by frictional wearing-pads 52, friction-plates 41 being preferably comparatively longer than shoes 15 so that when relative up or down movement takes place between member 14 and member 13, friction-plates 41 and shoes 15 will remain in contact throughout the length of shoes 15.

Pads 52 may be of any suitable wear resisting material adapted to create friction between plates 41 and plates 25, and are preferably rigidly secured in position as by being riveted to either plates 41 or plates 25.

Means are preferably provided for adjusting the respective ends of friction-plates 41 toward or from each other, instanced as accomplished by right and left hand screws 56, 57, secured to the ends of the respective friction-plates and having a nut 58 threaded upon the ends of the coacting screws, so that turning of nut 58 will move screws 56, 57, and the ends of the friction-plates secured thereto, toward or from each other. The screws are connected to the ends of plates 41 by providing an eye 59 in the head of each screw, adapted to be received upon a pin 60 secured to the plate. Pins 60 are exemplified as extending transversely of the friction-plates and are preferably secured thereto by reversely curling the ends of the plates about the pins, as shown at 62. Screw-eyes 59 are preferably received upon pins 60 intermediate of the ends of the respective pins; the curled ends 62 of the friction-plates being provided with slots 63 to receive the eyes, and through which the screws project. The adjusting nut 58 for the lower ends of friction-plates 41 is preferably received through stem 42 in an opening 64 suitably positioned therein.

The operation of my device is as follows: When the springs of the vehicle to which the shock absorber is attached, are exerting their normal tension, members 13, 14, of the shock absorber will be in their normal position, as illustrated in the drawings, with friction-plates 41 so positioned between shoes 15 that the portions of the plates having substantially the least lateral space between them, are opposite the pivot points of shoes 15. When the wheel of the vehicle strikes an obstruction, thus moving axle 12 toward frame 11, the springs of the vehicle are compressed, and stem 42 and plates 41 will be moved longitudinally upwardly between shoes 15, so that portions of the plates having an increasing wider space between them, will be positioned between shoes 15, the friction-plates thus exerting an increasing outward pressure upon the shoes against the action of springs 30, and the shoes swinging slightly downwardly upon their pivots to accommodate themselves to the movement of the plates. The frictional resistance to relative longitudinal movement between members 13, 14, is thus gradually increased, thereby cushioning the strain transmitted to the vehicle springs.

Upon the rebound of the springs of the vehicle, the movement of friction-plates 41, relative to shoes 15 will be in the opposite direction, to similarly gradually increase the frictional resistance exerted between members 13, 14, and thus reduce the rebound of the springs and the consequent shock and strain. It will be readily seen, that by the construction as thus described, the more violent the movement of the axle 12 relative to frame 11, the greater will be the frictional resistance offered to such movement, since portions of the friction-plates having a correspondingly wider space between them, will be brought into contact with the shoes to force the shoes and plates into more intimate frictional contact, since the greater the outward pressure exerted upon the shoes, the greater will be the spring resistance offered to such movement.

The frictional resistance offered to movement in one direction caused by an obstruction in the road, and the resistance offered to the consequent rebound of the vehicle springs, may be separately adjusted, by moving the proximate ends of friction-plates 41 toward or from each other, by means of adjusting nuts 58 and by means of bolt 44 there is an adjustment also provided for greater or less normal distance between the chassis 11 and the axle 12 of the vehicle.

While I have described my improved shock absorber, and the method of operating the same, as a shock absorber applied to the springs of a vehicle, it will be readily understood that the device is also applicable for use wherever it is desired to gradually cushion the movement of one body toward or from another, so as to eliminate excessive strain or shock.

Having thus fully described my invention, what I claim as new and desire to secure by Letters Patent, is:

1. In a shock absorber, the combination of a friction-member having opposed friction-faces of regular curvature, friction-shoes having padded friction-faces of similar regular curvature coacting with said first-named friction-faces, means for changing the curvatures of said first-named faces, means for resiliently forcing said faces toward each other, and means whereby to secure said friction-member and said friction-shoes, respectively, to two relatively vibratory parts of a vehicle.

2. In a shock absorber, the combination of a bow-spring arranged to be secured to one of two relatively vibratory parts of a vehicle, friction-shoes pivoted thereto, a friction-member arranged to be secured to the other of said relatively vibratory parts, said friction-member provided with opposed friction-faces, said friction-shoes provided with friction-faces coacting with said opposed friction-faces, pivot-pins on which said shoes are pivoted, said pivot-pins provided with eyes, springs at the respective sides of said shoes, and adjusting bolts for said springs located in said eyes.

3. In a shock absorber, the combination of a bow-spring arranged to be secured to one of two relatively vibratory parts of a vehicle, a friction-member, means for adjustably securing said friction-member to the other of said relatively vibratory parts for adjustably positioning said friction-member toward or from both said parts between the limbs of said bow-spring, said friction-member provided with oppositely curved friction-faces relatively separating toward their upper ends and toward their lower ends, and friction-shoes pivoted to the outer ends of said bow-springs, said friction-shoes having opposed curved friction-faces substantially concentric with and coacting with said first-named friction-faces, and said adjusting means relatively adjusting the horizontal radial lines of said friction-faces into coincident horizontal planes.

4. In a shock-absorber, the combination of a pair of relatively movable members arranged for attachment respectively to two relatively vibratory parts of a vehicle, one of said members provided with a pair of opposingly curved friction-faces curved in the plane of the vibratory movement between said two relatively vibratory parts, and the other of said members comprising a pair of pivoted friction-shoes provided with opposingly curved friction-faces respectively coacting with said respective first-named opposingly curved friction-faces, the curvatures of said coacting curved friction-faces in said plane of vibratory movement being substantially concentric.

5. In a shock-absorber, the combination of a pair of relatively movable members arranged for attachment respectively to two relatively vibratory parts of a vehicle, one of said members provided with a pair of opposingly curved friction-faces curved in the plane of the vibratory movement between said two relatively vibratory parts, the other of said members comprising a pair of pivoted friction-shoes provided with opposingly curved friction-faces respectively coacting with said respective first-named opposingly curved friction-faces, the curvatures of said coacting curved friction-faces in said plane of vibratory movement being substantially concentric, and the radii of said curvatures being longer than the distances between the pivotal axes of said respective shoes and their respective coacting friction-faces.

6. In a shock-absorber, the combination of a pair of relatively movable members arranged for attachment respectively to two relatively vibratory parts of a vehicle, one of said members provided with a pair of opposingly curved friction-faces curved in the plane of the vibratory movement between said two relatively vibratory parts, the other of said members comprising a pair of pivoted friction-shoes provided with opposingly curved friction-faces respectively coacting with said respective first-named opposingly curved friction-faces, the curvatures of said coacting curved friction-faces in said plane of vibratory movement being substantially concentric, the radii of said curvatures being longer than the distances between the pivotal axes of said respective shoes and their respective coacting friction-faces, and resilient means acting to cause pressure between said coacting friction-faces.

In testimony whereof, I have hereunto signed my name in the presence of two subscribing witnesses.

BERNARD J. BORGMANN.

Witnesses:
THERESA M. SILBER,
DAWSON E. BRADLEY.